United States Patent [19]

Sedlacek

[11] Patent Number: 4,956,036
[45] Date of Patent: Sep. 11, 1990

[54] METHOD OF MAKING A POWER TRANSMISSION BELT INCLUDING MOISTURIZING AND GRINDING

[75] Inventor: Douglas R. Sedlacek, Englewood, Colo.

[73] Assignee: The Gates Rubber Company, Denver, Colo.

[21] Appl. No.: 244,364

[22] Filed: Sep. 15, 1988

Related U.S. Application Data

[62] Division of Ser. No. 122,989, Nov. 19, 1987, Pat. No. 4,798,566.

[51] Int. Cl.$^5$ ............................................. B29C 67/14
[52] U.S. Cl. ................................... 156/137; 156/139; 156/154
[58] Field of Search ............... 156/137, 138, 139, 140, 156/142, 154; 474/237, 238, 263, 265, 260, 261, 262, 264, 266, 267, 268

[56] References Cited

U.S. PATENT DOCUMENTS

| | | | |
|---|---|---|---|
| 1,777,864 | 10/1930 | Short | 474/238 |
| 2,531,111 | 11/1950 | Daniels | 474/263 X |
| 3,190,137 | 6/1965 | Adams | 156/138 X |
| 3,416,383 | 12/1968 | Jensen et al. | 474/263 X |
| 3,839,116 | 10/1974 | Thomas et al. | 156/140 X |
| 3,871,240 | 3/1975 | Schnackenberg et al. | 156/140 X |
| 4,127,039 | 11/1978 | Hollaway | 156/137 X |
| 4,216,679 | 8/1980 | Howerton et al. | 474/238 |
| 4,305,714 | 12/1981 | Renshaw | 156/139 X |
| 4,330,287 | 5/1982 | Fischer | 474/238 |

FOREIGN PATENT DOCUMENTS

| | | | |
|---|---|---|---|
| 0149443 | 11/1980 | Japan | 474/263 |
| 0086648 | 5/1982 | Japan | 474/238 |

Primary Examiner—Michael W. Ball
Assistant Examiner—Steven D. Maki
Attorney, Agent, or Firm—H. W. Oberg, Jr.; C. H. Castleman, Jr.

[57] ABSTRACT

A method of making a power transmission belt with discontinuous fibers by forming oppositely facing friction driving surfaces by grinding such that fiber protrudes from the driving surfaces and is bent exposing lateral side portions of fiber.

6 Claims, 1 Drawing Sheet

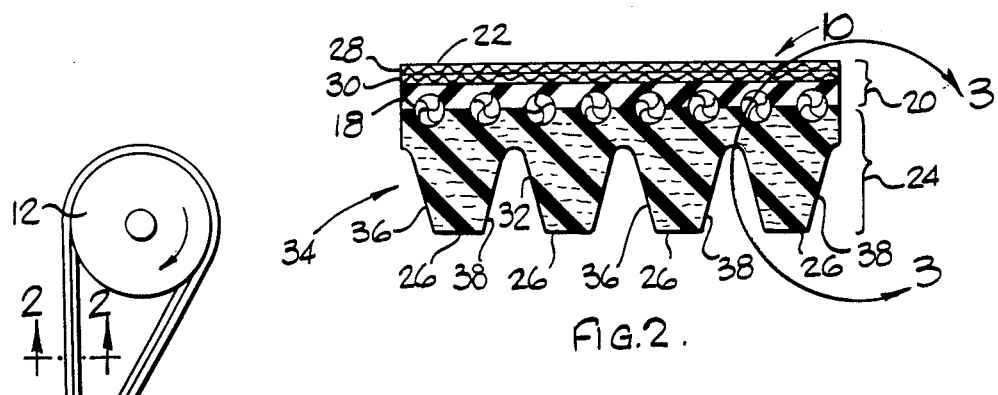
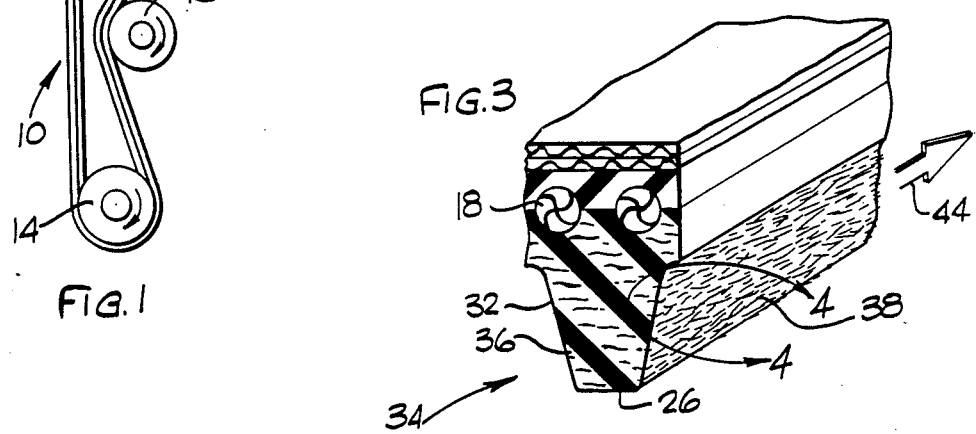
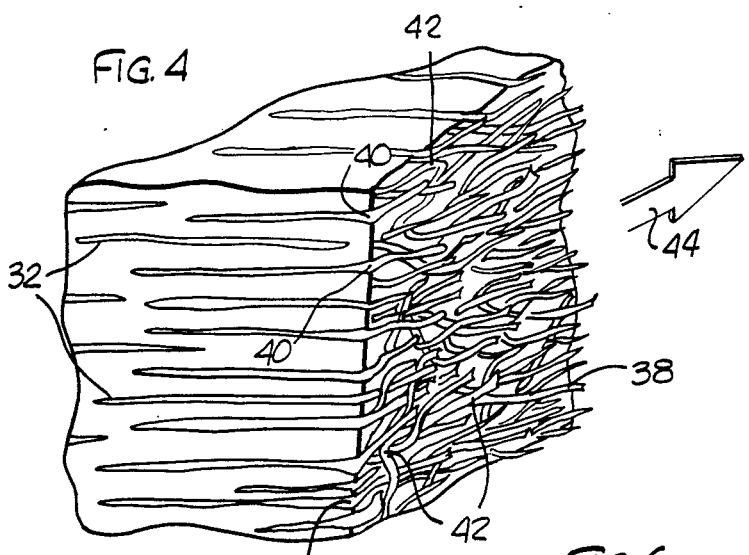
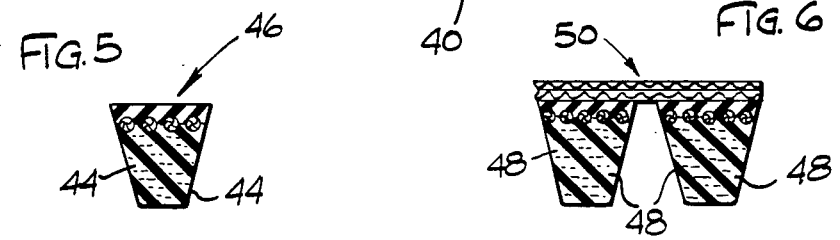

METHOD OF MAKING A POWER TRANSMISSION BELT INCLUDING MOISTURIZING AND GRINDING

This is a division of application Ser. No. 122,989, filed Nov. 19, 1987, and now U.S. Pat. No. 4,798,566.

BACKGROUND OF THE INVENTION

The invention relates to endless power transmission belts, but more particularly, the invention relates to what some in industry term as "raw edge" belts where oppositely facing friction driving surfaces are formed of an elastomeric body and in which are dispersed transversely oriented fibrous members.

There are several belt configurations which have "raw edge" friction driving surfaces defined as part of a layer where discontinuous fiber is dispersed and transversely oriented in an elastomeric matrix. An example of a joined belt utilizing fiber dispersed in an elastomeric matrix is shown in U.S. Pat. No. 1,777,864.

An example of a "raw edge" V-Belt employing discontinuous fiber dispersed in an elastomeric matrix is shown in U.S. Pat. No. 3,416,383. The fiber is transversely oriented at angles varying from 90°.

Ribbed-belts also may have a "raw edge" construction and employ a layered construction with discontinuous fiber transversely oriented in an elastomeric matrix. U.S. Pat. No. 4,330,287 discloses such a construction.

All of the foregoing patents disclose a construction where generally the end portions of the dispersed fiber terminate or are severed at their oppositely facing friction driving surfaces; however, the '383 Patent further shows that portions of the "raw edge" may wear at a faster rate than embedded fabric layers but not faster than the surfaces where there is embedded fiber.

The friction characteristics of the driving surfaces for all of the described belts may be modified by a construction where there are discrete protrusions of fiber extending beyond an elastomeric portion of the driving surfaces. The file history of the U.S. Pat. No. 3,871,240 includes photomicrographs showing that end portions of fiber are exposed at oppositely facing frictional driving surfaces of the belt. As further explained in the '240 Patent, cord or fabric at concentrations of 20 percent by volume are preferred although concentration as low as 5 percent may be used. This Patent also teaches, that fiber, when loaded in an elastomer at the preferred concentrations, do not give the best results.

The preferred construction of U.S. Pat. No. 3,871,240 may not be a suitable solution for all belt types because of the relative height of the friction driving surfaces. For example, the use of cord or fabric is not a desirable solution for a multi-ribbed belt because of the relative small height of the ribs.

Another use of fiber at friction driving surfaces is shown in U.S. Pat. No. 3,190,137. Flocked fiber is embedded and vulcanized into peripheral sides of oppositely facing driving surfaces leaving very little, if any protruding fiber.

SUMMARY OF THE INVENTION

A belt construction is provided which is suitable for various belt forms with oppositely facing friction driving surfaces such as V-belts, joined V-belts, and multi-ribbed belts. The power transmission belt of the invention is of the "raw edge" type with an elastomeric body in which is dispersed discontinuous fibers that are transversely oriented in relation to a longitudinal axis of the belt. Portions of fiber protrude from the body at the driving surfaces and are bent so as to expose lateral side portions of fiber which define part of the friction driving surfaces.

An advantage of the invention is that the lateral side portions of fiber have a greater surface area than the generally end portions of protruding fiber as disclosed and taught in the prior art. Consequently lower loadings of fiber in percent by volume may be used to alter the frictional characteristics of the oppositely facing driving surfaces.

Another advantage is realized when in a multi-ribbed belt of the invention is exposed to low angular frequencies of about 20 Hz and high angular acceleration (e.g., angular accelerations up to 3,000 rad/sec$^2$). The invention has the beneficial result of substantially inhibiting pilling of the lateral surfaces at the low frequencies. Consequently, belt life is improved in such applications.

In accordance with the method of the invention, a high tenacity and wear resistant fiber is dispersed in an elastomeric matrix of which a body is formed. The matrix with dispersed fiber, is optionally ground in the presence of a moisturing liquid and oppositely-facing friction driving surfaces are formed. The fibers have sufficient tensile modulus so as to inhibit them from being cut or ground off at an elastomer interface during the grinding operation. The fibers are bent along the driving surfaces and lateral side part portions.

An object of the invention is to provide a belt construction where discontinuous fiber may be effectively used to control the frictional properties of a driving surface; a resulting advantage of the invention is that discontinuous fibers may be used at a volumetric loading of approximately half of that preferred as taught in the prior art where end portions of fiber are exposed.

Other advantages or objects of the invention will be apparent after reviewing the drawings and description of preferred embodiments. Although the invention is adaptable to power transmission belts in general, a multi-ribbed belt is shown in detail for illustration purposes wherein;

FIG. 1 is a schematic view showing a multi-ribbed belt of the invention trained around grooved pulleys and tensioned with a backside idler;

FIG. 2 is an enlarged fragmentary cross sectional view taken along the line 2—2 of FIG. 1 showing the belt in free span;

FIG. 3 is an enlarged view taken generally along the line 3—3 of FIG. 2 but showing a portion of the belt in partial isometric view to further illustrate a friction driving surface;

FIG. 4 is an enlarged view taken along the line 4—4 of FIG. 3 and showing protruding fibers bent to expose lateral side portions of fiber at a frictional driving surface; cross hatching is not used for clarity;

FIG. 5 is a view similar to FIG. 2 but showing a V-belt of the invention; and

FIG. 6 is a view similar to FIG. 2 but showing a joined V-belt of the invention.

DESCRIPTION OF PREFERRED EMBODIMENTS

Referring to the Figures, a power transmission belt 10 of the invention with a multi-ribbed configuration is trained around multi-grooved pulleys 12, 14 and tensioned by a backside idler 16. The belt is fabricated using known techniques and has a tensile member 18 or load carrying section that is sandwiched between a first layer 20 forming the top portion 22 of the belt and a second layer 24 in which is formed a plurality of circumferential ribs 26. Any desired material may be used as the tensile member such as cord of cotton, rayon, nylon, polyester, aramid, steel or even discontinuous fibers oriented for load carrying capability. Any of the suitable elastomeric materials may be used in constructing the first and second layers. For example, elastomers such as synthetic rubbers, natural rubbers, or blends thereof may be used. One or more layers 28, 30, of a textile material may be embedded in the top of the first layer to form a wear resistance surface such as to accomodate backside idlers or pulleys in a drive system.

Discontinuous fiber 32 is dispersed in at least a major portion of that part of the second layer which forms a body portion 34 having oppositely facing friction driving surfaces 36, 38. The fiber preferably has a length in a range from about 0.04 in. (1 mm) to about 0.47 in. (12 mm); but more preferably, the fiber has a length from about 0.16 in. (4 mm) to about 0.28 in. (7 mm); and most preferably from about 0.16 in. (4 mm) to about 0.24 in. (6 mm).

It is important that the fiber have a greige tensile modulus sufficient to inhibit the fiber from being severed at the elastomer-fiber interface during a grinding operation when forming the oppositely facing sides (which is hereinafter explained in conjunction with the method of the invention). The fiber should have good wear resistant qualities so that it is not substantially worn away during belt use. Examples of fiber having suitable tension modulus and wear resistant qualities are aramid fibers, such as those sold under the trademark KEVLAR by du Pont de Nemours & Company; the trademark TECHNORA as sold by Teijin of Japan; and the trademark Twaron as sold by Enka of Holland [all having a greige tensile modulus of at least about $9 \times 10^6$ psi (6333 Kg/mm$^2$)].

The elastomeric body portion is loaded with fiber preferably from about 0.5 to about 20 percent by volume, and more preferably from about 1 to about 6 percent by volume. Most preferably, the fiber loading is about 3 percent by volume of the body portion (i.e., that portion of the body having the oppositely facing driving surfaces).

The oppositely facing friction driving surfaces 36, 38 are formed in such a manner as to leave portions of fiber protruding from the elastomer at the oppositely facing driving surfaces. Most of the fiber protrudes from about 0.004 in. (0.1 mm) to about 0.012 in. (0.3 mm) from the elastomeric body. In contrast, new prior art belts using cotton fiber have protruding portions from about 0.0026 in. (0.65 mm) to about 0.005 in. (0.13 mm). Thus, belts of the invention have fiber protruding approximately twice as far as that of known prior art belts.

The protruding fiber portions are bent 40 against the body in such a manner as to expose lateral side portions 42 which define part of the friction driving surface. As particularly shown in FIG. 4, most of the fiber portions are bent substantially in the same general direction leaving them oriented generally longitudinally 44 with the belt driving surfaces. It is estimated that the lateral side portions of fiber cover from about 15 percent to about 52 percent of the driving surface area at fiber loadings from about 1.7 percent to about 6 percent by volume respectively.

Method

As previously mentioned, the elastomeric body with dispersed fiber is ground to form oppositely facing friction driving surfaces. It is already known to form oppositely facing driving surfaces by grinding an elastomeric layer in which is dispersed discontinuous fiber. An example of such a grinding process is disclosed in U.S. Pat. No. 3,839,116. However, such known processes sever or terminate the fiber at the elastomeric body so that substantially only end portions of fiber are exposed.

As previously mentioned, it is important to have a fiber with a sufficiently high greige tensile modulus to inhibit severing the fiber at the elastomer-fiber interface during the grinding operation. In accordance with the invention, discontinuous fiber, such as aramid fiber, is dispersed in a elastomeric layer in known fashion and oriented transversely of the belt. The body is ground in the presence of a moisturizing liquid such as water soluable oil or water. It is believed that the moisturizing liquid acts to lubricate the fiber and. inhibit it from being severed at the elastomer-fiber interface. The grinding operation also operates to orient the fiber generally longitudinally along the driving surface by bending the fiber and exposing lateral side portions.

The grinding operation may be used in defining opposite facing frictional driving surfaces 44 of a V-belt 46 as illustrated in FIG. 5 or the opposite facing frictional driving surfaces 48 of a joined belt 50 such as illustrated in FIG. 6.

Use

In use, a multi-ribbed belt of the invention is used as in a serpentine front end-drive of a firing diesel engine. During operation of the engine, in such an application, low oscillatory angular frequencies of about 25 Hz. are encountered along with angular acceleration as high as about 3,000 rad/sec$^2$. A belt of the invention operated for 50 hours with no appreciable pilling as measured by a weight loss of only about 1 percent, and the protruding fiber remained substantially intact. Comparatively, a prior art belt with discontinuous cotton fiber (flock) was operated on the same engine for 50 hours where there was significant pilling as measured by a belt weight loss of about 9.7 percent; the portions of protruding cotton fiber was worn away to the elastomeric body.

A peculiar problem associated with multi-ribbed belts is that of "pilling buildup" between adjacent ribs where pills accumulate and are retained. Because of this, "weight loss" is not always a totally accurate measurement. Nevertheless, belts of the invention exhibited substantially no "pilling buildup" whereas the prior art belt exhibited "pilling buildup" accompanied with substantial weight loss.

The improved performance of the belt of the invention is attributed to the exposed lateral side portions of fiber which define part of the friction driving surface. As a fiber loading of about 5.2 percent by volume, the lateral side portion of fiber covers about 45 percent of the friction driving surfaces which is about 3 times greater than a prior art belt having substantially the same loading of cotton fiber.

The foregoing detailed description is made for purpose of illustration only and is not intended to limit the scope of the invention which is to be determined from the appended claims.

What is claimed is:

1. In a method of making an elastomeric rubber-type power transmission belt with an embedded load carrying section and an elastomeric layer having dispersed discontinuous fiber oriented transversely of the belt by grinding the elastomeric layer and forming oppositely facing friction driving surfaces, the improvement comprising the steps of:

dispersing discontinuous fiber in the elastomeric layer to a fiber loading from about 1 to about 6 percent by volume, the fiber having a greige tensile modulus sufficient to inhibit the fiber from being severed during grinding;

forming oppositely facing friction driving surfaces while moisturizing with a liquid and grinding elastomer away and leaving portions of fiber protruding from the oppositely facing driving surfaces;

said grinding bending a majority of protruding fiber portions and exposing lateral side portions of fiber; and establishing part of the friction driving surfaces with the lateral side portions of fiber.

2. The method of claim 1 comprising dispersing discontinuous aramid fiber in the elastomer layer.

3. The method of claim 1 comprising dispersing discontinuous aramid fiber in the elastomer, the fiber of the type as sold under the trademarks KEVLAR, TECHNORA and TWARON.

4. The method of claim 1 comprising grinding oppositely facing friction surfaces while forming a multi-ribbed belt.

5. The method of claim 1 comprising grinding oppositely facing friction surfaces while forming a V-belt.

6. The method of claim 1 comprising grinding oppositely facing friction surfaces while forming a joined V-belt.

* * * * *